(12) United States Patent
Rohde et al.

(10) Patent No.: US 8,311,188 B2
(45) Date of Patent: Nov. 13, 2012

(54) USER INTERFACE WITH VOICE MESSAGE SUMMARY

(75) Inventors: Ruben Rohde, Alameda, CA (US);
Johannes von Sichart, San Jose, CA (US); Cordell Ratzlaff, Palo Alto, CA (US); Alison Ruge, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 961 days.

(21) Appl. No.: 12/099,641

(22) Filed: Apr. 8, 2008

(65) Prior Publication Data

US 2009/0252305 A1 Oct. 8, 2009

(51) Int. Cl.
*H04M 1/64* (2006.01)
(52) U.S. Cl. ............... 379/88.13; 379/93.23; 455/413
(58) Field of Classification Search ............ 379/88.13, 379/88.14, 89; 455/413, 566; 345/173; 709/206
See application file for complete search history.

(56) References Cited

U.S. PATENT DOCUMENTS

| | | | |
|---|---|---|---|
| 5,568,540 A * | 10/1996 | Greco et al. | 379/88.25 |
| 5,838,320 A | 11/1998 | Matthews, III et al. | |
| 6,185,527 B1 | 2/2001 | Petkovic et al. | |
| 7,479,949 B2 | 1/2009 | Jobs et al. | |
| 7,532,913 B2 * | 5/2009 | Doulton | 455/566 |
| 2003/0128820 A1 * | 7/2003 | Hirschberg et al. | 379/88.14 |
| 2004/0066919 A1 * | 4/2004 | Seligmann | 379/88.13 |
| 2006/0010217 A1 * | 1/2006 | Sood | 709/206 |
| 2007/0293272 A1 | 12/2007 | Salmon | |
| 2008/0031595 A1 | 2/2008 | Cho | |
| 2008/0055264 A1 * | 3/2008 | Anzures et al. | 345/173 |
| 2008/0207176 A1 * | 8/2008 | Brackbill et al. | 455/413 |
| 2009/0177301 A1 | 7/2009 | Hayes | |

FOREIGN PATENT DOCUMENTS

| | | |
|---|---|---|
| EP | 1 109 390 A2 | 6/2001 |
| EP | 1 345 394 A1 | 9/2003 |
| WO | WO 2004/095422 A2 | 11/2004 |
| WO | WO 2007/002753 A2 | 1/2007 |

OTHER PUBLICATIONS

"Voicemail users are drowning in data every day. How can they manage their important messages better?", SCANMAIL, p. 1 of 1, http://avatarweb.com/scanmail/, printed Apr. 8, 2008.
Calore, "Voicemail-as-Text Service Quiets the Ringing in your Ears", WIRED, Jun. 25, 2007, http://www.wired.com/print/software/webservices/news/2007/06/callwave.
"Automatic summarization", Wikipedia, Mar. 1, 2008, http://en.wikipedia.org/wiki/Automatic_summarization.

(Continued)

*Primary Examiner* — Fan Tsang
*Assistant Examiner* — Van D Huynh

(57) ABSTRACT

In one embodiment, a graphics user interface is provided. The graphics user interface includes a plurality of graphical representations. Each of the plurality of graphical representations identifies a separate voice message. A summary of content of each of the separate voice messages is displayed for each of the plurality of graphical representations, respectively. Each of the plurality of graphical representations is configured to be selected for playback of the respective voice message.

19 Claims, 4 Drawing Sheets

OTHER PUBLICATIONS

International Search Report for corresponding case PCT/US2009/038936 dated Jul. 15, 2009.

Written Opinion of the International Searching Authority for corresponding case PCT/US2009/038936 dated Jul. 15, 2009.

Whittaker et al., "SCANMail: A Voicemail Interface That Makes Speech Browsable, Readable and Searchable," Apr. 20, 2002, CHI 2002 Conference Proceedings, Conference on Human Factors in Computing Systems, Minneapolis, MN Apr. 20-25, 2002, vol. No. 4, Issue No. 1, pp. 275-282.

International Search Report for corresponding case PCT/US2009/039634 dated Jul. 17, 2009.

"One Voicemail Box— All your messages in one place," GrandCentral from Google, http://grandcentral.com/home/one_voicemail, printed Apr. 8, 2008.

"GoogleTube Video of the Day," Google, http://gvod.blogspot.com/, printed Apr. 8, 2008.

"Mac OSX Tips— Tips and Tricks for the Mac OS," Safari Mac OSX, Oct. 16, 2007, http://www.macosxtips.co.uk/index_files/tips-for-safari-3.html.

"The world's best browser. Now on Windows, too," Safari 3, http://www.apple.com/safari/, printed Apr. 8, 2008.

* cited by examiner

USER INTERFACE WITH VOICE MESSAGE SUMMARY

BACKGROUND

The present disclosure relates generally to data communication and user interfaces.

Communication is a vital tool and aspect of today's business world and social network. Computers, cellular ("cell") phones, personal digital assistants ("PDAs"), and other devices are used on a daily basis to transmit and receive data regarding a plethora of topics and information. For example, voice messages, such as voicemails, are used to leave audible or speech messages when the intended recipient is unavailable to talk or have a discussion.

However, recipients may receive several voice messages in a given day. Accordingly, the recipients may not have time to listen to all of the voice messages immediately and may have to allocate different times to listen to separate voice messages or ignore some voice messages all together. Relatively important voice messages may be lost or mixed in with other voice messages that are relatively less important or relevant.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

By way of introduction, the example embodiments described below include a graphics user interface and associated methods. For example, the graphics user interface includes one or more icons identifying respective voice messages. A summary of a voice message is displayed with the icon identifying the voice message.

According to a first aspect, a graphics user interface is provided. The graphics user interface includes a plurality of graphical representations. Each of the plurality of graphical representations identifies a separate voice message. A summary of content of each of the separate voice messages is displayed for each of the plurality of graphical representations, respectively. Each of the plurality of graphical representations is configured to be selected for playback of the respective voice message.

According to a second aspect, a voice signal is received. The voice signal is stored as a voice message. The voice message is one of a plurality of voice messages that are represented as a plurality of icons. Textual summaries of the voice messages are transmitted to a user interface corresponding to the respective plurality of icons.

According to a third aspect, a first image object is displayed. A second image object is displayed. The first image object and the second image object identify separate voice messages, respectively. A summary of content of each voice message is displayed for the first image object and the second image object, respectively. Selection of the first image object or the second image object is received for playback of the respective voice message.

According to a fourth aspect, a server is operable to monitor voice data between a plurality of devices. The server is further operable to obtain a textual summary of a voice message corresponding to one of the plurality of devices. The one of the plurality of devices includes a user interface having an icon representing the voice message. The server is further operable to transmit the textual summary to the one of the plurality of devices. The textual summary is displayed within the icon. The icon is configured to be selected for playback of the voice message.

The present invention is defined by the following claims, and nothing in this section should be taken as a limitation on those claims. Further aspects and advantages of the invention are discussed below in conjunction with the preferred embodiments.

Example Embodiments

Voice messages, such as voicemails, are converted to text. A content analysis is performed on the text to summarize the text. A summary, such as a phrase of one or more words, is displayed, such as in a subject line, within a graphical representation identifying each of the voice messages. A list of graphical representations for each voice message is generated so that a user can search, prioritize, and choose voice messages based, at least in part, on the displayed summaries.

Figure 1:
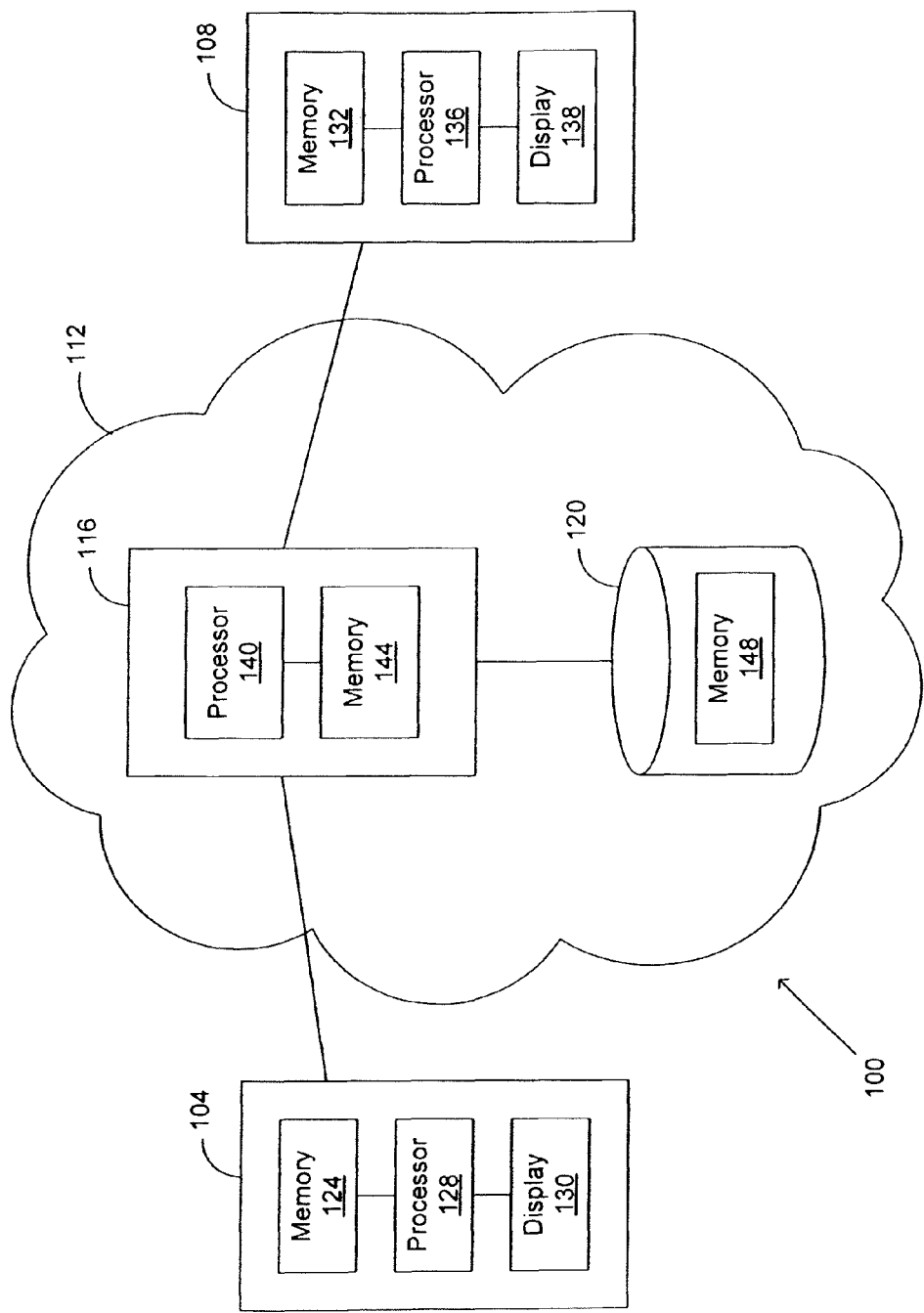
FIG. 1 illustrates one embodiment of a data communication system.

FIG. 1 shows a data communication system 100 (hereinafter referred to as "system 100"). The system 100 is an Internet protocol-based system, an Intranet system, a telephony system, a voice over Internet protocol ("VoIP") system, a cellular based system, a message system, a wireless or wired audio/visual data communication system, and/or any known or future data communication system.

The system 100 includes, but is not limited to, a user or client device 104, a network 112, and another user or client device 108. The network 112 includes a server 116 and a repository or database 120. Additional, different, or fewer devices or components may be provided. For example, a proxy server, a billing server, a name server, a switch or intelligent switch, other computers or workstations, administrative components, such as an administrative workstation, a gateway device, a backbone, ports, network connections, and network interfaces may be provided. While the components in FIG. 1 are shown as separate from one another, one or more of these components may be combined.

The user device 104 is a wireless device (e.g., a cellular phone, a PDA, a wireless computer), a wired or cabled device (e.g., a desktop computer using a broadband cable or digital subscriber line ("DSL") connection), a landline based or VoIP telephone, or any other data communication device that can transmit or convey aural content, speech, or voice messages. A user uses the device 104 to initiate and/or conduct voice or speech conversations as well as leave voice messages, such as voicemails, with an intended recipient. For example, the user device 104 communicates with the user device 108 or the server 116 associated with the user device 108 via the network 112.

The user device 104 includes a memory 124, a processor 128, and a display 130. Additional, different, or fewer components may be provided. For example, an input device is provided, such as a button, keypad, keyboard, mouse, trackball, rocker switch, touch pad, or voice recognition circuit. Audio components may be provided. For example, a speaker, one or more microphones, an antenna, a transceiver, audio jacks, and/or other components for outputting or receiving audible or sound signals may be provided. Alternatively, the audio components may be part of a separate device or are separate devices that may be placed in communication with the user device 104.

The processor 128 is in communication with the display 130 and the memory 124. The processor 128 may be in communication with more or fewer components. The processor 128 is a general processor, application-specific integrated circuit ("ASIC"), digital signal processor, field programmable gate array ("FPGA"), digital circuit, analog circuit, or combinations thereof. The processor 128 is one or more processors operable to control and/or communicate with the various electronics and logic of the user device 104. The processor 128, the memory 124, and other circuitry may be part of an integrated circuit.

The processor 128 is operable to generate voice or speech data. For example, analog aural or speech signals are received and processed into digital signals. The digital signals include one or more packets of data corresponding to speech components. Alternatively, the processor 128 may generate data packets that are to be converted into audio signals without receiving any input speech signals, such as a computer based voice message. Also, the processor in combination with a transmitter may generate radio frequency ("RF") signals to transmit speech or voice content. In alternative embodiments, the server 116 or other device generates the voice or speech data from stored data or received in an analog format.

The display 130 is any mechanical and/or electronic display positioned for accessible viewing in, on, or in communication with the user device 104. For example, the display 130 is a touch screen, liquid crystal display ("LCD"), cathode ray tube ("CRT") display, or a plasma display. The display 130 is operable to display graphical representations of voicemails, emails, websites, and other data or media.

The memory 124 is any known or future storage device. The memory 124 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 124 may be part of the processor 128.

The user device 104 is operable to communicate with the user device 108 via the network 112. The network 112 is the Internet, a cellular network, an intranet, a local area network ("LAN"), a wide area network ("WAN"), a virtual private network ("VPN"), a message network, a VoIP network, a telephone network, and/or any known or future network. The network may contain cellular basestations, servers, computers, or other systems, devices, or components for transferring and/or modifying data. The server 116 and the database 120 are shown to be within the network 112. However, the server 116 and/or database 120 may be outside the network 112 or may be part of a separate network.

The server 116 communicates with the user device 104, the user device 108, and the database 120. The sever 116 is a provider server, an application server, communications server, database server, proxy server, file server, web server, client server, peer-to-peer server, and/or any known or future server. For example, the server 116 is a network access server, a gateway general packet radio service ("GPRS") support node, and/or an authentication, authorization, and accounting ("AAA") server. The server 116 is operable to receive voice or speech data from the user device 104 and 108. The server 116 is a software and/or hardware implementation. For example, the server 116 is an application program. Alternatively, the server 116 is a server computer or any other hardware that executes and runs server applications.

A hardware implementation of the server 116 includes, but is not limited to, a memory 144 and a processor 140. Additional, different, or fewer components may be provided. The processor 140 is in communication with the memory 144. The processor 140 may be in communication with more or fewer components. The memory 144 and the processor 140 are similar to or different than the memory 124 and the processor 128, respectively. The processor 140 analyzes and/or modifies the voice or speech data and passes or transmits the data to the user device 108. The processor 140 may also store or save the voice or speech data as a voice message in the memory 144 or the database 120.

The server 116 is operable to convert the voice or speech data into textual or word data. For example, the processor 140 or other component, such as a converter, identifies speech content and associates words or phrases with the speech content to generate text corresponding to the voice message. Filtering, dividing the speech content into intervals, and other techniques may be used. A look-up-table or a digital library may also be used for the conversion. Key words based on length of the word, a domain knowledge base, or other source may be identified and used as part of the summary.

Instead of converting an entire voice message into text, the server 116 generates a summary or textual summary of the voice message. For example, the summary includes a gist of the voice message. The summary provides more than just a name, date, time, or number. For example, the summary may provide a central or main point, idea, or communication that is to be conveyed by the voice message. The summary is generated by identifying one or more words within the voice message. For example, key words, selected words, or indicators may be predetermined and stored in a memory, such as the memory 144 or 148, a look-up-table, or a digital library. The processor 140 or other component, such as a comparator, identifies the key or predetermined words or indicators in the voice message and generates a textual summary based on the identified words. Alternatively, the server 116 summarizes the voice message based on an algorithm. The summarization may or may not include words within the voice message. Also, the server 116 may convert an entire voice message into text and then generate a summary based on the text data. Any known or future technique of summarizing voice or speech content may be used.

The features and/or methods described in U.S. Pat. No. 6,185,527 ("System and method for automatic audio content analysis for word spotting, indexing, classification and retrieval") may be utilized. For example, reliable information retrieval, also referred to as "word spotting," may be facilitated in long, unstructured audio streams, including audio streams that have been extracted from audio-video data. Special audio prefiltering may be used to identify domain/application specific speech boundaries to index only relevant speech segments that are generated by a speech recognition engine, to facilitate subsequent reliable word spotting. For example, content of audio streams may be analyzed to identify content specific, application specific, genre specific clear speech boundaries with associated confidence levels. Confidence levels generated by a speech recognition engine are used and combined with weighting to index a transcript of selected portions of the audio (i.e., relevant speech) as generated by the speech recognition engine.

In an alternate embodiment, instead of summarizing the voice message into a textual or word summary, the server 116 may provide an image, photo, or picture that corresponds to a question, action, event, or other visual summary. For example, a library or database of pictures may be used to identify different messages.

The functionality of the server 116 may be implemented on a different or separate device. For example, a gateway device, a switch, an intelligent switch, a router, or other device may be used to execute the tasks of the server 116.

The database 120 is in communication with the server 116. The database 120 is a central repository, a cache network, distributed database of a plurality of databases, or any known or future data storage device or system. The database 120 includes a memory 148. Additional, different, or fewer components may be provided. For example, one or more processors may be provided. The memory 148 is similar to or different than the memory 144 and/or 124.

The database 120 receives and stores data, such as voice message data. For example, when a first user attempts to call or have a conversation with a second user (e.g., the user device 104 attempts to transmit voice data to the user device 108 via the server 116), the first user may have to leave a voice message or voicemail if the second user is not available. In such a case, the server 116 generates a voice message from the voice data received and stores the voice message in the memory 144 and/or the database 120 (via the memory 148). The storage of the voice message in the memory 144 may be relatively temporary compared to the storage in the database 120. The database 120 may partition voice messages based on different users, locations, timings, or other factors. Alternatively, the database 120 may also store the generated summaries corresponding to the respective voice messages.

Stored voice messages may be retrieved from the database 120 or the server 116 by a user (e.g., via the user device 108) to listen to the respective voice message and/or to prepare a summary. The database 120 may be integrated into the server 116. Alternatively, the server 116 may transmit the voice message to the user device 108 upon creation of the voice message to be stored on the user device 108.

The user device 108 is similar to or different than the user device 104. The user device 108 includes a memory 132, a processor 136, and a display 138. Additional, different, or fewer components may be provided such as described in regards to the user device 108. The memory 132, the processor 136, and the display 138 are similar to or different than the memory 124, the processor 128, and the display 130, respectively. The user device 108 is used to view graphical representations or icons representing voice messages, such as voicemails, and used to playback the voice messages. The summaries or textual summaries corresponding to the voice messages may also be viewed via the user device 108. The user device 108 may also perform the functionalities of the user device 104 and vice versa.

Figure 2:
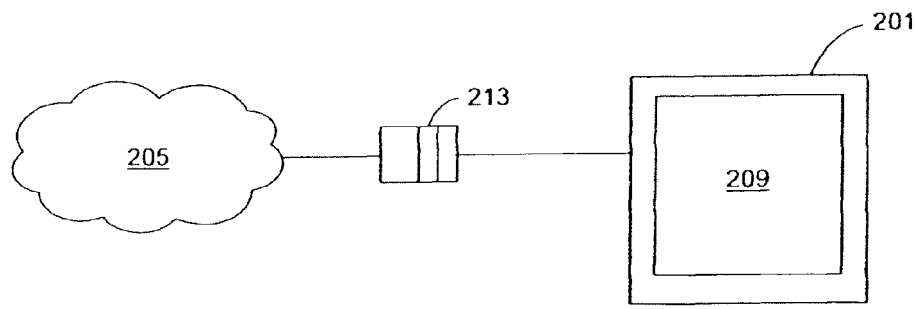
FIG. 2 illustrates an embodiment of a user device in communication with a network of a system, such as the system of FIG. 1.

FIG. 2 shows a user device 201 in communication with a network 205, such as the network 112. The user device 201 is similar to the user device 108 and/or the user device 104. For example, the user device 201 is a cellular telephone, a digital telephone, a computer, or a PDA. The user device 201 includes a screen or display 209, such as the display 130 and/or 138. The screen 209 is used to view graphical representations of voice messages or visual voicemails.

The user device 201 communicates with the network 205. For example, when a server or device in the network 205 generates a voice message, the network 205 sends or transmits data 213, such as one or more data packets, to the user device 201. The data 213 is used to make the user device 201 aware of the voice message. For example, the data 213 is received by the user device 201, and based on the data 213, a graphical representation, image object, or icon identifying the voice message is generated or displayed on the user device 201. The graphical data that is to be displayed may be part of the data 213 or may be generated in the user device 201. The data 213 may also include a textual summary or summary of a respective voice message. The summary is displayed with the corresponding graphical representation, image object, or icon identifying the voice message. The summary content may be transmitted to the user device 201 separate from the data 213.

Alternatively, the data 213 may be or include the voice message content that is to be played back via the user device 201. For example, if a user selects the graphical representation, image object, or icon identifying or representing a certain voice message, the user device may send a request to the network 205 (e.g., a server or database in the network 205) to obtain or retrieve the voice message content, and the network transmits the voice message content to the user device, such as via the data 213. Or, the voice message content may be stored on the user device 201. The textual summaries or summaries may also be generated in the user device 201 rather than in a server or other network device.

Figure 3:
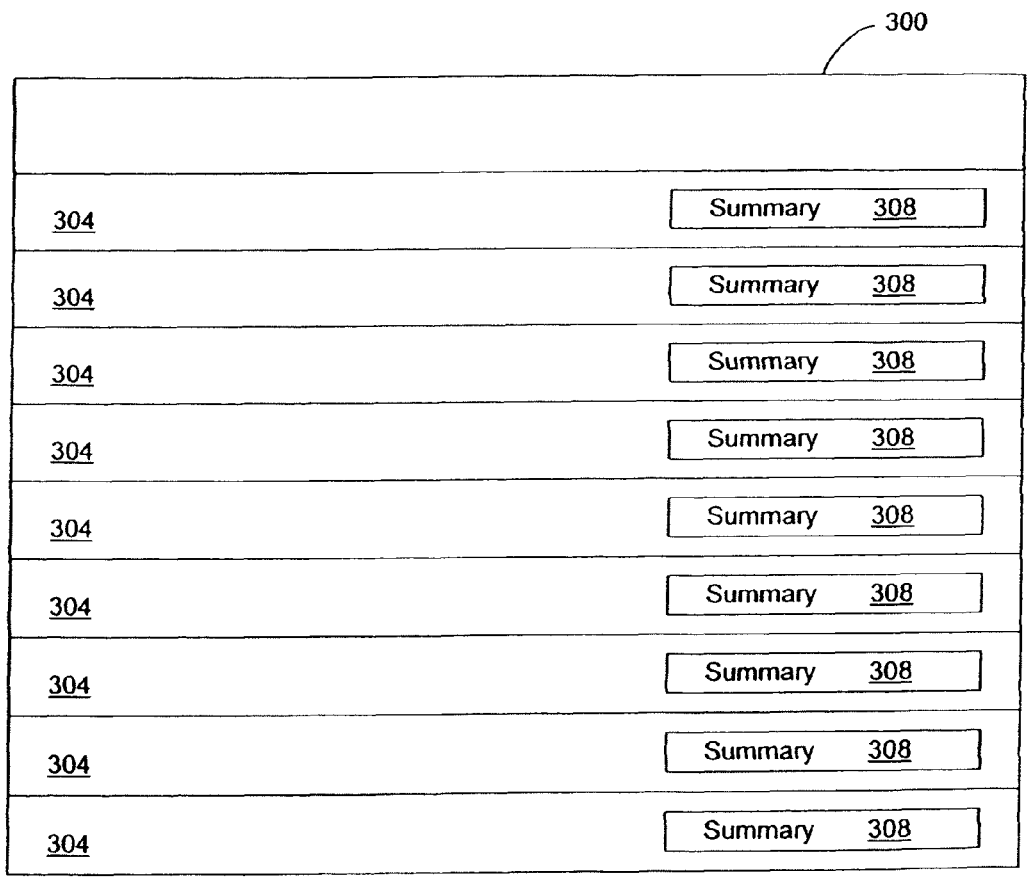
FIG. 3 illustrates an embodiment of a graphics user interface of a user device, such as the user device of FIG. 2.

FIG. 3 shows a graphics user interface 300 of a user device, such as the user device 104, 108, and/or 201. The graphics user interface 300 is executed on a display, such as the display 130, 138, and/or 209. The graphics user interface 300 includes one or more graphical representations, image objects, or icons 304 identifying respective voice messages, such as voicemails. A textual summary or summary 308 is displayed with a respective icon 304. Additional, fewer, or different features may be displayed. For example, time data, personal information of a caller, caller identification, date data, activation buttons or icons, or other content may also be displayed with the icons 304.

For example, a list of graphical representations 304 is displayed in the graphics user interface 300. The graphical representations 304 correspond to and identify separate voice messages or visual voicemails ready to be selected for playback by a user. The graphical representations 304 are contained within a same screen shot or window. For example, the list of icons 304 is displayed within a voicemail inbox screen or equivalent screen for a user to view his or her voicemail messages. Alternatively, multiple screens or windows may be used for displaying different icons 304. For example, deleted icons 304 or icons 304 related to voicemails that have been listened to may be listed in a first window or screen shot, and saved icons 304 or icons 304 related to voicemails that have not been listened may be listed in a second window or screen shot.

The image objects 304 have a substantially rectangular shape. Alternatively, the image objects 304 may have a substantially oval, circular, or other geometrical shape. In other alternatives, no shape is provided, such as where the objects 304 are merely listed. The image objects 304 may be represented in a two dimensional or three dimensional perspective. Also, the image objects 304 may be illustrated with the same or similar color or shading or may be illustrated with a variety of or different colors or shadings.

The image objects 304 are listed in chronological order. For example, the most recent image object 304 may be listed at the top or beginning of the list. Alternatively, the image objects 304 may be listed based on the respective summary 308 or other user preferences (e.g., configure the list by sender). For example, the user device or network may prioritize the ordering of the icons 304 based on an importance relative to the summaries 308. The importance may be predetermined based on key words or phrases. Listing of the icons 304 may take a variety of forms. For example, the graphics user interface 300 may list the icons 304 in a vertical, horizontal, circular, or other geometrical pattern. A user may scroll up or down to view all the icons 304 within a respective screen or window.

The summaries 308 include one or more words or phrases that summarize, encapsulate, or provide a gist of the respective voice messages. For example, each summary 308 includes at most about ten words. Fewer or more words may be used. Alternatively, the summaries 308 may be in a picture or photo format. The summary indicates the content of the voicemail, such as providing more information than the date, time, and person involved. For example, a message about project Manhattan has a summary of "Albert lunch" for a voicemail of "Umm, hi, this is Albert, want to chat over lunch?"

The summaries 308 are displayed in, on, or over each of the respective icons 304. For example, the summary 308 of each of the separate voice messages is displayed within a border of the respective graphical representation 304. The summaries 308 are visually present when the respective graphical representations 304 are listed. The summaries 308 may be displayed across a portion of a respective icon 304 or across the entire icon 304. Alternatively, one or a few words rather than the entire summary may be displayed with the respective icon 304. A user may select or click on an icon 304 to view the entire summary 308. Or, a separate window or screen, such as a pop-up screen, may be used to display the summaries 308. For example, a user may have the ability to "hover over" or concentrate on a desired icon 304 (e.g., passing a mouse icon, finger, or stylist pen over a desired icon 304) or select a desired icon 304 to view the respective summary 308. The summaries 308 allow a user to differentiate relatively more important voice messages from relatively less important voice messages. The summaries 308 provide an advantage of prioritization.

Figure 4:
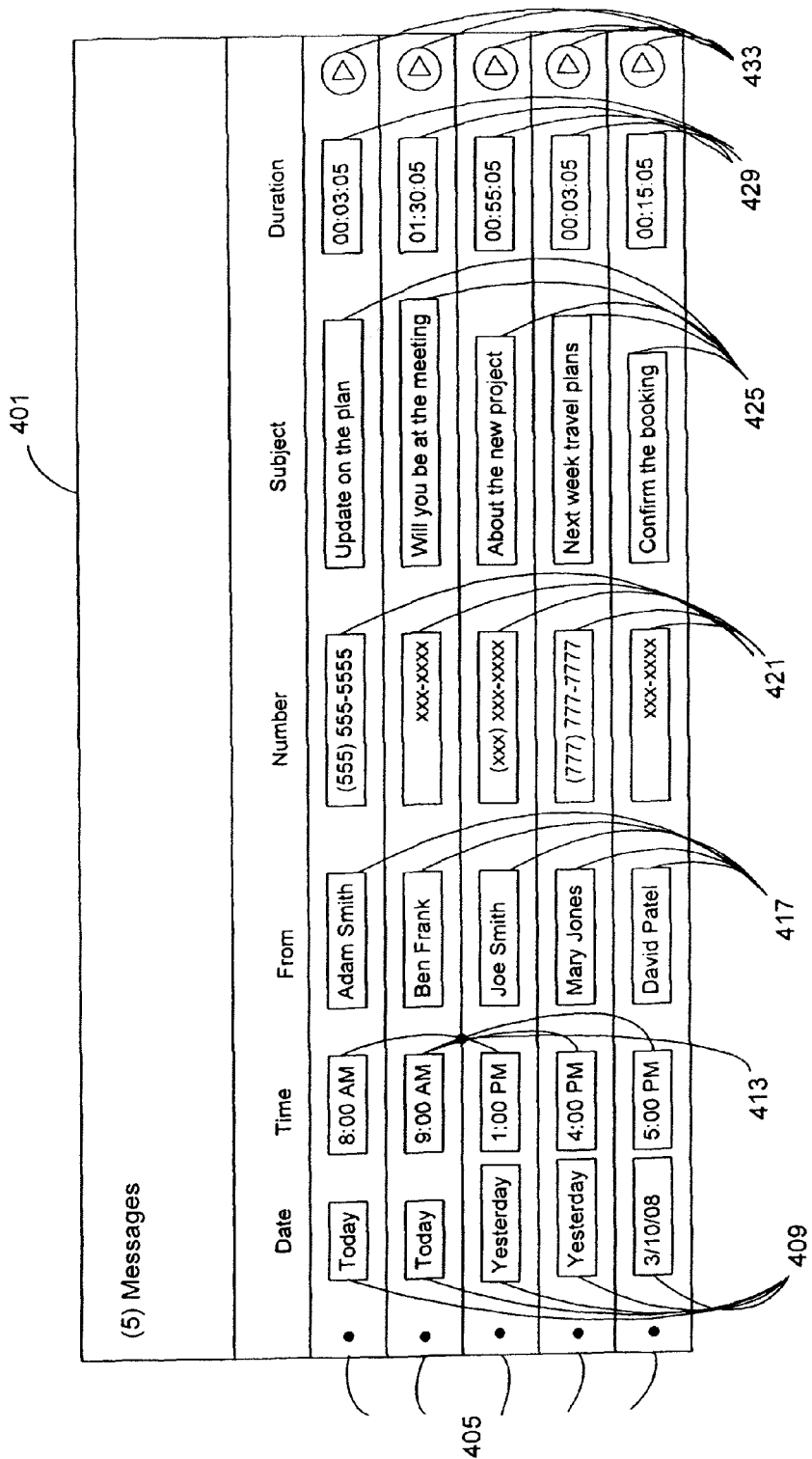
FIG. 4 illustrates an alternate embodiment of a graphics user interface of a user device, such as the user device of FIG. 2.

FIG. 4 shows a graphics user interface 401 of a user device, such as the user device 104, 108, and/or 201. The graphics user interface 401 may be similar to or different than the graphics user interface 300. The graphics user interface 401 includes or displays date information 409, time information 413, sender information 417, phone number information 421, subject information 425, and duration information 429 for each listed voice message icon 405. The icons 405 are similar to or different than the icons 304. The number of messages and activation icons or soft buttons 433 are also provided.

The date information 409 and the time information 413 represents when a user received the respective voice message. The date and time information may be configured to user preferences, such as representing the date in a United States or European fashion. The sender information 417 identifies the person who left the voice message. For example, a full or partial name may be displayed. The name may be extracted from the voice message itself or may be identified through a network database, caller identification, or a memory network. Entity or company names may be used instead of personal names. The phone number information 421 corresponds to the phone number or Internet protocol address of the sender of the voice message. The phone number information 412 may or may not include area code information or foreign numbers. The phone number information 412 may also be extracted from the voice message or caller identification. For example, a person leaving the voice message may say or speak the number he of she is calling from or a contact number, and that number may be extracted from the voice message.

The subject information 425 includes textual summaries or summaries, such as the summaries 308, of respective voice messages. One or more words or a phrase summarizing or providing a gist of the voice message is displayed. The gist or summary may be more than a number, name, date, or time associated with the voice message. For example, the gist or summary may provide the essence or central message or communication (e.g., material or significant words) that is to be conveyed by the voice message. Examples of summaries include: "Will you be at the meeting," "About the new project," "Update on the plan," Next week travel plans," and "Confirm the booking."

The duration information 429 represents how long the voice message is temporally. A user may view the duration information 429 to determine which voice message will be quicker or faster to review. The activation button 433 is an icon or soft button to select, activate, or initiate a respective voice message. By selecting the activation button 433, a user may listen to the respective voice message via an audio output on the user device or in communication with the user device. The activation button 433 may be used to stop or pause playback of the voice message as well.

Figure 5:
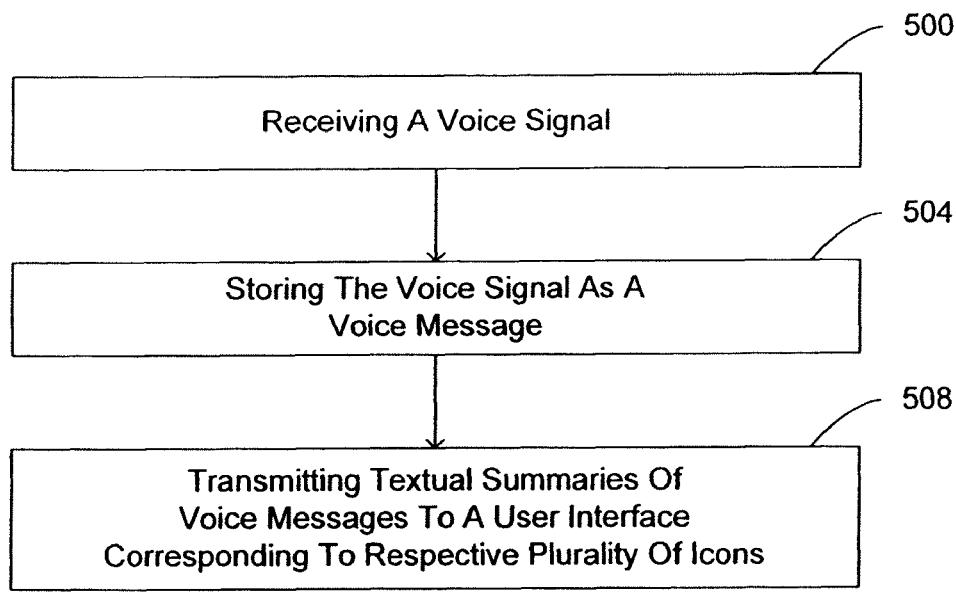
FIG. 5 illustrates one embodiment of a method for generating data for a graphics user interface, such as the graphics user interface of FIG. 3 and/or FIG. 4.

FIG. 5 shows a method for generating data for a graphics user interface, such as the graphics user interface 300 and/or 401. Fewer or more acts may be provided. In act 500, a voice signal is received. For example, a first user initiates a call to a second user via a phone, computer, or PDA. The second user is unavailable, and, therefore, the first user leaves a voice message for the second user. Speech content from the first user is converted into voice data or signals. Voice data, such as data packets, or voice signals are transmitted to a network, such as the network 112 or 205. A server or basestation, such as the server 116, or a user device receives the voice data or signal.

In act 504, the voice signal or data is stored or saved as a voice message, such as a voicemail. For example, the server stores the voice message in a repository or database, such as the database 120. The server or other device reviews the voice data or signal to generate a textual summary or summary. The server may communicate or transfer data back and forth with the database to generate the summary. The summary provides a gist, subject matter content, information in addition to who, where, and when of the voicemail, and/or content in the voice portion of the voice message. The summary is generated by identifying one or more words within the voice message via a look-up-table, a library, a dictionary, a knowledge base, machine learnt dictionary, user defined key terms, or other resource. Alternatively, the summarization may or may not include words within the voice message. Any known or future technique of summarizing voice or speech content may be used. Also, a picture or photo summary may be used instead of a text summary.

In act 508, the textual summaries or summaries of respective voice messages are transmitted to the user interface. Alternatively, the summaries are generated in or by the user device that executes the user interface. The summaries are displayed with icons or graphical representations identifying respective voice messages, such as the icons 304 and/or 405. For example, the summaries are displayed in each respective icon. Time data, personal information of a caller, activation buttons or icons, and/or other features may also be displayed with the icons. Also, graphical data used to display the icons and other features of the graphics user interface may be transmitted to the user device or may be generated by the user device.

Figure 6:
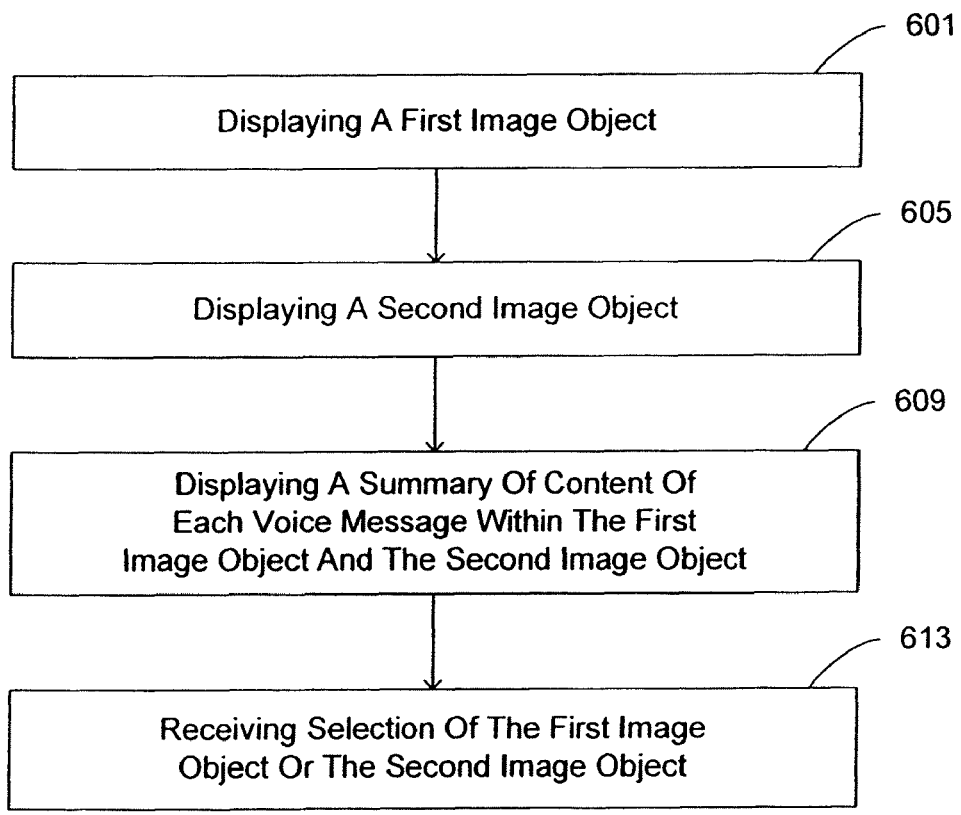
FIG. 6 illustrates an embodiment of a method of executing a graphics user interface, such as the graphics user interface of FIG. 3 and/or FIG. 4.

FIG. 6 shows a method for executing a graphics user interface, such as the graphics user interface 300 and/or 401. Fewer or more acts may be provided. In act 601, a first image object, such as an image object 304 or 405, is displayed. For example, the second user may turn on his or her computer, phone, PDA, or other user device and view a voicemail inbox and/or graphics user interface screen or window. The window displays an icon identifying a voice message.

In act 605, a second image object, such as another image object 304 or 405, is displayed. The second image object identifies a separate or other voice message. The second and first image objects are arranged in a list format. For example, the first and second image objects are displayed in the same window or screen. The second user may scroll up and down within the screen to view multiple icons identifying different voice messages.

In act 609, a summary of content of each voice message is displayed within the first and second image objects. For example, summaries 308 or subject information 425 is fully or partially shown in each respective image object. Alternatively, the summaries are hidden and are displayed in a separate window when a specific image object is addressed or concentrated on. The second user may prioritize or decide which voice message to listen to based on the summaries.

In act 613, selection of the first image object or the second image object is received for playback of the respective voice message. For example, the second user decides to listen to the voice message corresponding to the first image object because the summary corresponding to the voice message may be relatively more important than other summaries. The first image object includes an activation button, such as the activation button 433, and the second user selects the activation button for playback. Based on the selection, the user device requests the stored voice message from the database or server in the network, and the database or server transmits the voice message to the user device in response to the query. The user device outputs audio signals to play the voice message. The audio signals may be outputted by speakers in or on the user device or by another device in communication with the user device. Alternatively, the voice message is stored on the user device, and requesting the voice message from the network may be avoided.

The logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A graphics user interface comprising:
   a plurality of graphical representations, each of the plurality of graphical representations identifying a separate voice message;
   a textual summary of content of each of the separate voice messages generated based on identified keywords and displayed for each of the plurality of graphical representations, respectively, wherein the separate voice messages are displayed in a prioritized order according to a priority determined based on the identified keywords; and
   a name and of each of the separate voice messages displayed for each of the plurality of graphical representations, respectively;
   wherein each of the plurality of graphical representations is configured to be selected for playback of the respective voice message using an activation icon, wherein the plurality of graphical representations including activation icons, summaries of content, and names are displayed simultaneously on a screen of a user device.

2. The graphics user interface of claim 1, wherein the user device comprises a telephone, a computer, or a personal digital assistant.

3. The graphics user interface of claim 1, wherein each of the graphical representations are displayed in a list format.

4. The graphics user interface of claim 3, wherein the summary of content of each of the separate voice messages is displayed within a border of the respective graphical representation, the summaries being visually present when the respective graphical representations are listed.

5. The graphics user interface of claim 1, wherein each of the graphical representations comprises a rectangular shape.

6. The graphics user interface of claim 1, wherein each of the graphical representations illustrates a name corresponding to the respective voice message.

7. The graphics user interface of claim 1, wherein each of the graphical representations illustrates a time corresponding to the respective voice message.

8. A method comprising:
   receiving a voice signal;
   storing the voice signal as a voice message, the voice message being one of a plurality of voice messages that are represented as a plurality of icons;
   identifying at least one keyword in each of the plurality of voice messages based on a list of keywords stored in a memory;
   generating textual summaries of the plurality of voice messages based on the identified keywords;
   prioritizing the plurality of voice messages according to importance based on the textual summaries of the voice messages to define a prioritized order of the voice messages; and transmitting the textual summaries of the voice messages and the prioritized order of the voice messages to a user interface corresponding to the respective plurality of icons; and displaying a list of voice message in the prioritized order including each of the textual summaries.

9. The method of claim 8, wherein each of the textual summaries comprises at most ten words.

10. The method of claim 8, wherein each of the textual summaries comprises a phrase or words corresponding to a main point of the entire respective voice message and is displayed with the respective icon.

11. A method comprising:

displaying a first image object and a first voice message summary representative of a content of a first voice message;

displaying a second image object and a second voice message summary representative of a content of a second voice message;

comparing the first and second voices message summaries to a word list stored in a memory;

identifying a first priority of a first keyword in the first voice message summary and the word list;

identifying a second priority of a second keyword in the second voice message summary and the word list;

comparing the first priority to the second priority to define an order;

displaying a sender name of the first and second voice messages for the first image object and the second image object in a list according to the order; and receiving selection of the first image object or the second image object for playback of the respective voice message.

12. The method of claim 11, wherein the first image object and the second image object are displayed on a same screen shot and the respective summary and an activation button are displayed within the first and second image objects.

13. The method of claim 11, wherein the summaries of each voice message comprises a phrase or words identified from the respective voice message.

14. The method of claim 11, wherein the playback of the respective voice message comprises an audio output of the respective voice message.

15. A server comprising:

a memory storing a list of keywords and associated priorities;

a processor configured to monitor voice data between a plurality of devices to identify at least one keyword from the list of keywords and generate a picture summary of a voice message corresponding to one of the plurality of devices, the one of the plurality of devices including a user interface having an icon representing the voice message positioned according to the associated priorities; wherein the server is configured to transmit the picture summary to the one of the plurality of devices, the picture summary displayed within the icon, wherein the icon is configured to be selected for playback of the voice message from a list of voice messages and picture summaries displayed simultaneously.

16. The server of claim 15, wherein the server comprises a network access server.

17. The server apparatus of claim 15, the icon illustrates a phone number corresponding to the voice message.

18. The method of claim 8, further comprising:

storing priorities associated with the list of keywords in the memory.

19. The method of claim 8, further comprising:

displaying an activation button for each of the plurality of voice messages simultaneously, wherein the activation button is configured to play the voice signal.

* * * * *